(12) United States Patent
Oran

(10) Patent No.: US 10,988,223 B2
(45) Date of Patent: Apr. 27, 2021

(54) ELECTRICAL UNDERWATER JET MOTOR WITH MULTIPLE STATOR FOR SEA VEHICLES

(71) Applicant: Elif Oran, Konya (TR)

(72) Inventor: Elif Oran, Konya (TR)

(73) Assignee: MISAL TASARIM DANISMANLIK MAKINA MEDIKAL ITHALAT IHRACAT SAN. VE TIC. LTD. STI., Konya (TR)

( * ) Notice: Subject to any disclaimer, the term of this patent is extended or adjusted under 35 U.S.C. 154(b) by 0 days.

(21) Appl. No.: 16/569,751

(22) Filed: Sep. 13, 2019

(65) Prior Publication Data

US 2020/0001960 A1    Jan. 2, 2020

Related U.S. Application Data

(63) Continuation-in-part of application No. PCT/TR2017/050727, filed on Dec. 29, 2017.

(30) Foreign Application Priority Data

Mar. 14, 2017 (TR) .................................. 2017/03875

(51) Int. Cl.
*B63H 21/17* (2006.01)
*B63H 1/16* (2006.01)
(Continued)

(52) U.S. Cl.
CPC .............. *B63H 21/17* (2013.01); *B63H 1/16* (2013.01); *B63H 5/15* (2013.01); *B63H 11/107* (2013.01);
(Continued)

(58) Field of Classification Search
CPC . B63H 21/17; B63H 1/16; B63H 5/15; B63H 11/107; B63H 2001/165;
(Continued)

(56) References Cited

U.S. PATENT DOCUMENTS

| 4,989,466 A | * | 2/1991 | Goodman | .............. G01C 21/18 |
| | | | | 352/243 |
| 5,117,141 A | | 5/1992 | Hawsey et al. | |

(Continued)

FOREIGN PATENT DOCUMENTS

| FR | 2768119 A1 | 3/1999 |
| TR | 201109302 A2 | 1/2012 |

(Continued)

*Primary Examiner* — Anthony D Wiest
(74) *Attorney, Agent, or Firm* — Bayramoglu Law Offices LLC

(57) ABSTRACT

An electric underwater jet motor designed for vehicles traveling above or below the sea. The electric underwater jet motor includes a plurality of stators for marine crafts; at least one radial stator, at least one rotor, at least two impeller blades, a magnetic bearing; at least one permanent magnet bar; at least one axial stator, hydrodynamic bearing components, a motor housing and an engine fastener; a hydrodynamic jet motor housing; and a control unit including a microprocessor, a software, magnetic bearing distance sensors, counter and speed measurement sensors, gyroscopic balance sensors to provide comfortable travel by collected data to reduce an effect of sea currents and wave movements which are the consequences of seasickness on the passengers at sea, heat and humidity sensors, pressure measurement sensors, voltage and ampere measurement sensors, a motor drive circuitry, software algorithms, an energy management system, a control panel, batteries and battery charging components.

21 Claims, 7 Drawing Sheets

(51) Int. Cl.
*B63H 5/15* (2006.01)
*B63H 11/107* (2006.01)
*H02K 7/09* (2006.01)
*B63H 11/00* (2006.01)
*B63H 11/08* (2006.01)
*B63H 23/00* (2006.01)
*H02K 7/14* (2006.01)

(52) U.S. Cl.
CPC ......... *H02K 7/09* (2013.01); *B63H 2001/165* (2013.01); *B63H 2011/008* (2013.01); *B63H 2011/081* (2013.01); *B63H 2021/173* (2013.01); *B63H 2023/005* (2013.01); *H02K 7/14* (2013.01)

(58) Field of Classification Search
CPC ........ B63H 2011/008; B63H 2011/081; B63H 2021/173; B63H 2023/005; H02K 7/09; H02K 7/14
See application file for complete search history.

(56) References Cited

U.S. PATENT DOCUMENTS

| | | |
|---|---|---|
| 5,256,090 A | 10/1993 | Woolley |
| 5,702,273 A | 12/1997 | Cho et al. |
| 8,222,762 B2 * | 7/2012 | Borgen ................ H02K 7/1838 290/55 |
| 8,905,723 B1 * | 12/2014 | Blanco ................ B63H 11/103 417/187 |
| 10,428,732 B2 * | 10/2019 | Lynn ......................... F02C 3/16 |
| 2009/0111339 A1 | 4/2009 | Suzuki |
| 2010/0007148 A1 | 1/2010 | Davis |
| 2013/0157530 A1 | 6/2013 | Davies |
| 2016/0031540 A1 * | 2/2016 | Broinowski .......... B63H 11/113 415/148 |

FOREIGN PATENT DOCUMENTS

| | | |
|---|---|---|
| WO | 03025385 A2 | 3/2003 |
| WO | 2009153124 A2 | 12/2009 |
| WO | 2012029031 A1 | 3/2012 |

* cited by examiner

ELECTRICAL UNDERWATER JET MOTOR WITH MULTIPLE STATOR FOR SEA VEHICLES

CROSS REFERENCE TO THE RELATED APPLICATIONS

This application is bypass continuation-in-part application of the International Application No. PCT/TR 2017/050727, filed on Dec. 29, 2017, which is based upon and claims priority to Turkish Patent Application No. 2017/03875, filed on Mar. 14, 2017, the entire contents of which are incorporated herein by reference.

TECHNICAL FIELD

The invention is about an electrical underwater propulsion motor system which is developed for marine vessels, has multiple axial and radial stator, and, in which the direct-drive technology without shaft is used. Outside the motor hub, there are multiple stators and inside the motor, there is the hollow rotor which has no shaft. The rotor and the blades fixed in it form the impeller together. The impeller rotates with no contact to the stator on the hydrodynamic bearings supported by the magnetic bearings. The system pushes the incoming water backward through its nozzle with a high pressure forming a water-jet flow through which a high drive force is obtained.

BACKGROUND

A significant portion of the world's oil is used in marine vehicles and marine transportation. If no action is taken, it is predicted that carbon dioxide emission will be higher by 20% than today's value, which will trigger global warming to a significant extent. Given the fact that oil reserves are running out, it is now time to develop alternative environmentally sensitive clean energy systems. Sustainable development in the maritime sector will be driven by the use of electricity, which is quieter, cleaner and more efficient for marine vehicles.

Superconductivity, as is known, is the ability of some materials to show no electrical resistance above or below certain temperature levels. A wire of superconducting conductor can handle approximately one hundred times more current than its counterpart, copper wire, can handle. Thus, it electric motors can generate much higher power with less energy. Today, high-temperature and low-temperature superconducting wire technology has shown a rapid development. Superconductivity is now a serious alternative for electric motors. It is predicted that potentially higher efficiencies will be obtained from superconducting electric motors or generators to be developed in the future. Electric machines operating with superconductor technology are costly, but their efficiency is much higher. Costs are expected to decline over the next few years. In addition, the newly developed second generation superconductor wires are thinner and offer new opportunities for industrial designers because they are like a flat band, and the designs of such electrical machines are more flexible.

Today, superconducting equipment is being used in MR imaging and wind turbines, and they are truly achieving high-energy efficiency compared to its counterparts. Superconducting wind turbines can achieve several times more energy at the megawatt level compared to the conventional counterparts. It is also clear that similar developments will be observed in electrical motors whose operating mechanisms are not so different. Because superconducting systems have superior features such as high reliability, low maintenance and long life. It is envisaged that underground or submarine superconducting transmission lines will replace high-voltage power transmission lines. Superconducting cables resistant to seawater will probably provide energy transmission from mainland to islands through superconducting energy transmission lines. It is obvious that such corrosion-resistant cables can also be used in electrical marine applications.

It has been reported that the efficiency of very large industrial superconducting motors used in the industry is up to 99%, which significantly reduces energy costs. It is envisaged that today's bulky structure of superconductor technology will be improved over time and less space-consuming, and lighter systems will be possible. Propulsion systems used in marine transportation vehicles do not have to be small and light. For this reason, although today electric motors operating with superconductivity technology can only be used in medium and large segment marine vessels, over time they will also be available for small segment marine vehicles.

In recent years, there have been important developments in the field energy storage, which resulted in a rapid increase in the use of capacitors with superconducting technology, which are called synchronous capacitors. The developed superconducting magnetic energy storage systems are called super capacitors or ultra capacitors. In these systems, there are briefly three key parts; a superconducting coil, a system that works with helium/nitrogen that cools the environment, and a system that provides power. Thus, electric motors consuming energy at very high megawatt levels can be fed by giant super capacitors using superconductor technology. As a result, when high-efficiency electric marine jet engines using superconducting technology are used, more fuel-efficient, quieter, more environmentally sensitive and less harmful transport will be achieved.

Our national patent application TR 2011 09302 (Electrical Jet Motor for Marine Vehicles) focused on the construction of "the rotor integrated with fan blades". Our ongoing work about the invention, for which the mentioned patent determines the scope of intellectual protection, revealed new technical problems. These technical problems are; first, none of the conventional electric motors used in this area uses water jet technology, but uses only the drive force of the fan. Second, there is a problem of low-efficiency in conventional electric motors used in this field. Third, the stainless steel large diameter bearing which works underwater could break down in a short time due to corrosion and cavitation it is exposed, which, in turn, increases the cost burden. Fourth, additional designs are needed to increase power and efficiency. Fifth, as the fan rotates freely, the water is scattered around by the effect of centrifugal forces which leads to the loss of efficiency for an effective drive force. The sixth is the rapid warm-up of the engine when running under load. Seventh, the design allowing only outboard mounting affects widespread use.

SUMMARY

The invention is a brushless, synchronous, servo fan motor used for propulsion in marine vehicles and basically operates within principles and mechanism of brushless electric motors. As known, electric motors consist of two coaxial parts, which are the fixed stator and the moving rotor. While electric motors operate at 98% efficiency at the optimum speed, which they are designed to operate, the efficiency drops considerably when operating at higher or lower speeds and this decrease is shown by the motor performance curve. The sea vehicles are moving at a very wide speed range. For this reason, the low efficiency of electric motors at different speeds (whether under or above the designed speeds) is a serious problem for the mentioned engines considering that these motors are powered by the batteries. Because the inefficient use of the batteries shortens the range that marine vehicles can reach, the preference of electric marine vehicles is negatively impacted. The invention, which allows batteries to be used with high efficiency at a wide range of speeds, has multiple axial and radial stators. These stators are optimized to operate at maximum efficiency at different speeds, and they are activated by the microprocessor at speeds, which they operate with high efficiency. For example, while the propulsion is obtained through a single stator for low speeds, other stators are activated by the microprocessor as the desired speed of the vehicle is increased. The microprocessor processes the data of the sensors through the relevant algorithms, and it activates and deactivates the corresponding stators to keep the efficiency maximum. Thus, the batteries are used at the highest efficiency (over 90% efficiency) for all speed ranges.

As a result of our studies, new ideas have emerged to solve the technical problems in the known state of the art. Suggestions to solve these problems are as follows: First, instead of merely utilizing the thrust force of the fan blades, a nozzle device, which can narrow and expand, is attached to the system. This ensures that the water is pressured in the outlet area and a jet stream is generated through nozzle. Second, the problem of efficiency loss occurring at different speeds in conventional electric motors is overcome by using multiple stators. Instead of using laminated silicon sheets in the stator, the design involves an ironless (no silicon sheets), frameless (no frames to place the bobbins), slotless (no slots for bobbins) stator along with the mono-helix, double-helix or triple-helix coil windings. This new design is also suitable for production with superconducting motor components. Thus, the efficiency is high even for large segment marine vessels. In addition, lightweight but durable materials, such as carbon fiber, are used as intermediate filling and support material in the rotor and stator to make the motor lightweight but durable. The fan blades are also made from lightweight but durable materials like carbon fiber. Third, instead of bearings which are exposed to corrosion and cavitation, a hybrid hydrodynamic pressure bearing surface and a magnetic bearing are used, which operate both radial and axial. Hydrodynamic bearing solutions are still widely used in hydro-turbines. Fourth, instead of single stator and single rotor systems, multiple rotor and multiple stator systems are proposed. Thus, efficiency and power are much higher. Also, in case of a fault in one of the stator, the engine will continue to run at low power with the other stator(s) and rotor(s) and will not stop. Fifth, the turbulence that occurs in the water passing through the propeller blades is smoothed out in the nozzle or in the diffuser blades before arriving, which ensures an effective thrust. Sixth, the blades at the inlet of the engine are designed as a water flow straightener. These blades both smooth the incoming water stream and they provide an additional cooling by forming a large surface. Thus, the system will be able to operate underwater with high efficiency without maintenance for many years. Seventh, for mounting of motor to marine vehicles, an inboard system is developed in addition to outboard system.

Figure 1A:
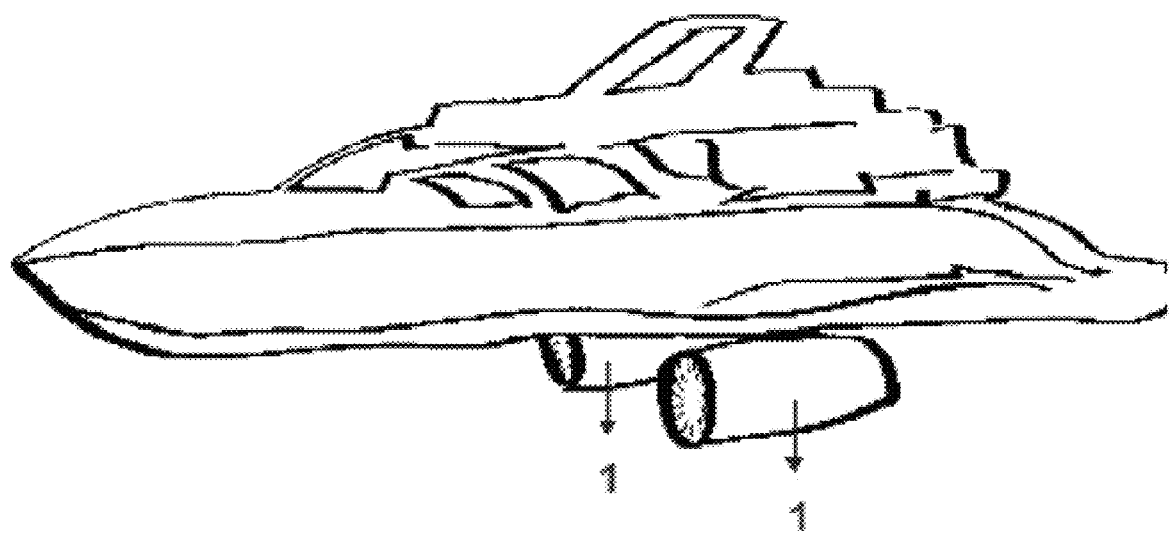
FIG. 1A shows a mounted view of an electric jet motor on a vehicle.

The elements illustrated in the figures are numbered as follows:
1. Electric Underwater Jet Motor
1.1. Stator (radial)
1.2. Rotor
1.3. Pusher impeller
1.4. Magnetic Bearing Components
1.5. Permanent Magnet Bars
1.6. Stator (axial)
1.7. Hydrodynamic Bearing Components
1.8. Motor Protection body
1.9. Motor Connection and Mounting Elements
2. Hydrodynamic jet motor housing
2.1. Hydraulic system that adjusts steering and the diameter and the direction of the nozzle
2.2. Flow straightener
2.3. Nozzle (output)
2.4. Diffuser blades
3. Control Unit
3.1. Microprocessor
3.2. Software
3.3. Magnetic Bearing (Distance) Sensors
3.4. Counter, hall effect and speed measurement sensors
3.5. Gyroscopic balance sensors
3.6. Heat and humidity sensors
3.7. Pressure measuring sensors
3.8. Voltage and ampere measurement sensors
3.9. Motor drive circuit
3.10. Software algorithms
3.11. Energy management system
3.12. Control Board
3.13. Batteries
3.14. Battery charging components

DETAILED DESCRIPTION OF THE EMBODIMENTS

Figure 1B:
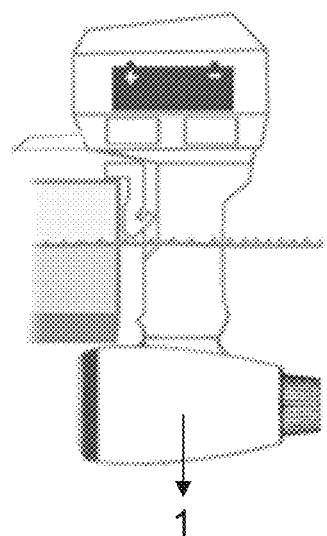
FIG. 1B shows a view of a battery integrated in a motor mount set.
Figure 1C:
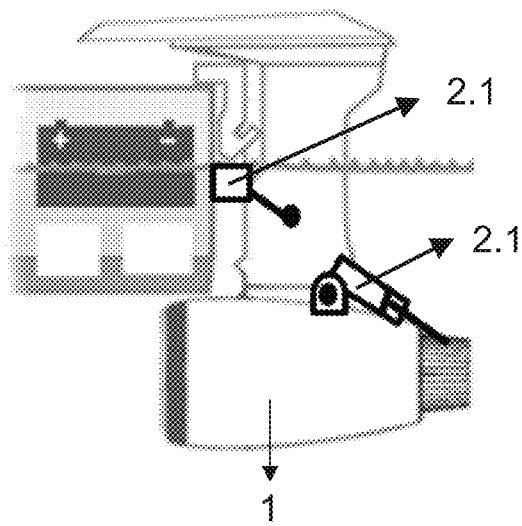
FIG. 1C shows a view of the battery Integrated into the vehicle body.
Figure 2:
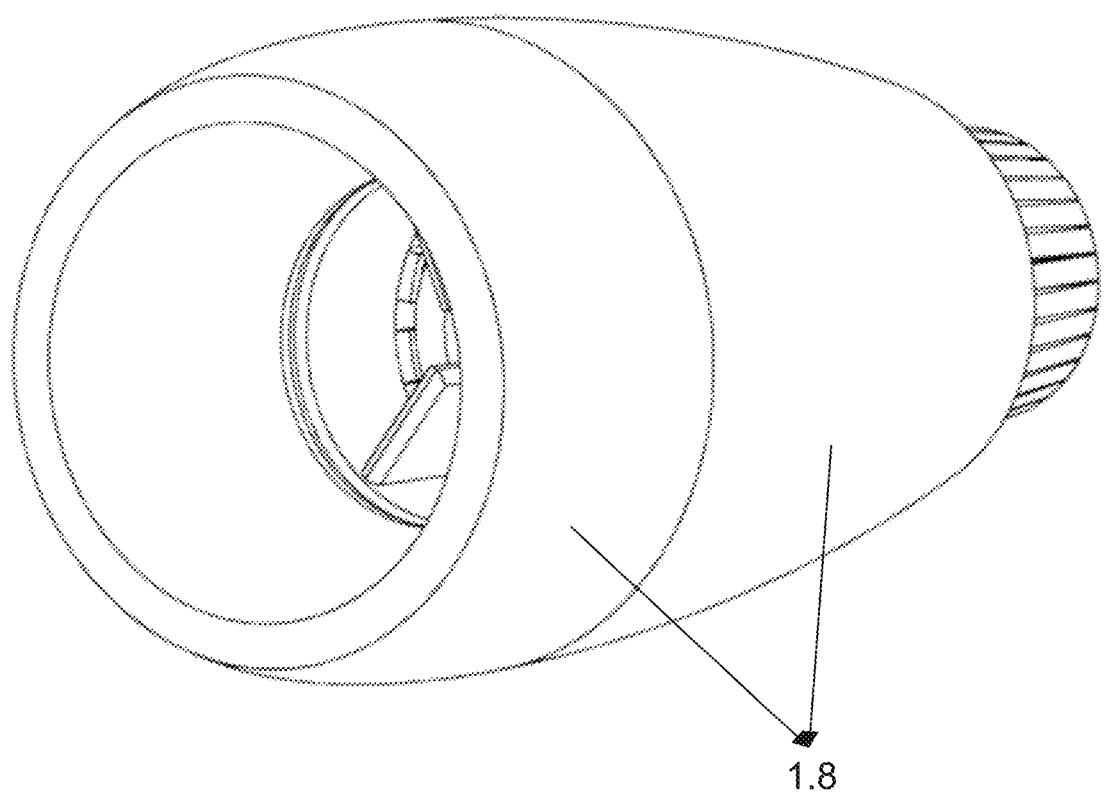
FIG. 2 shows an assembled view of the electric jet engine.
Figure 3:
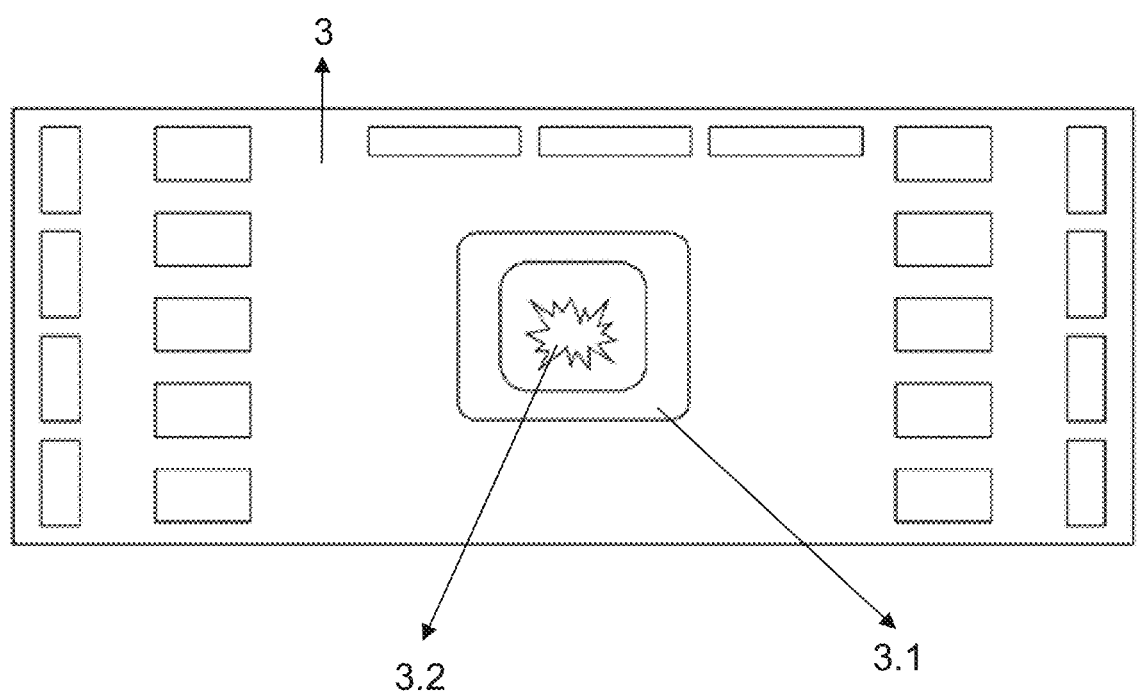
FIG. 3 shows a view of a control unit.
Figure 4:
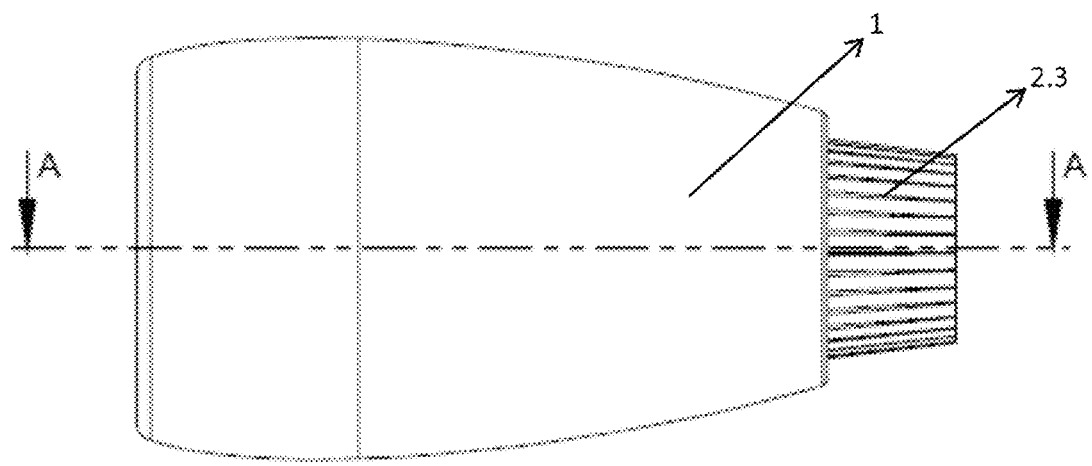
FIG. 4 shows a side view of the electric jet motor.
Figure 5:
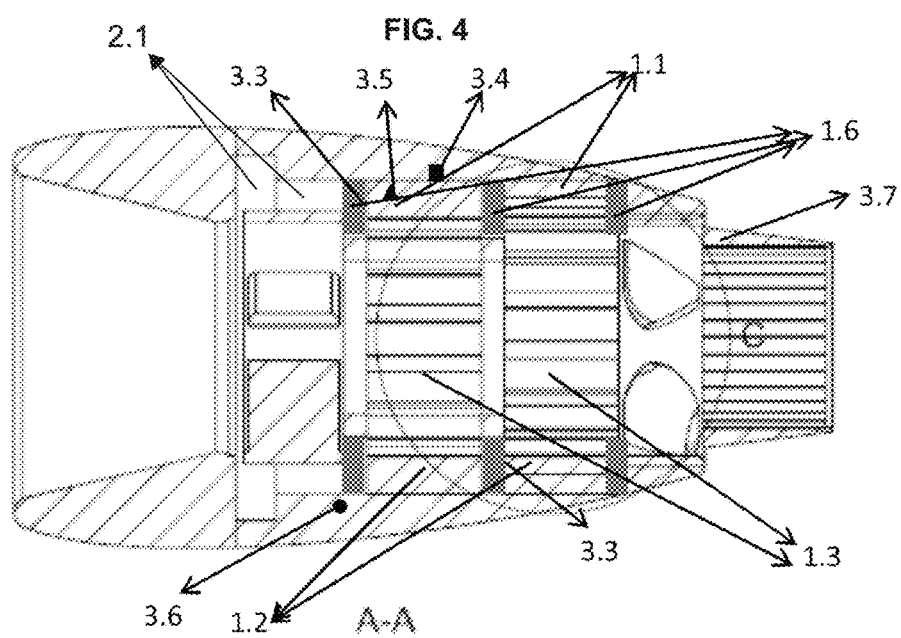
FIG. 5 shows a A-A section view of the electric jet motor.
Figure 6:
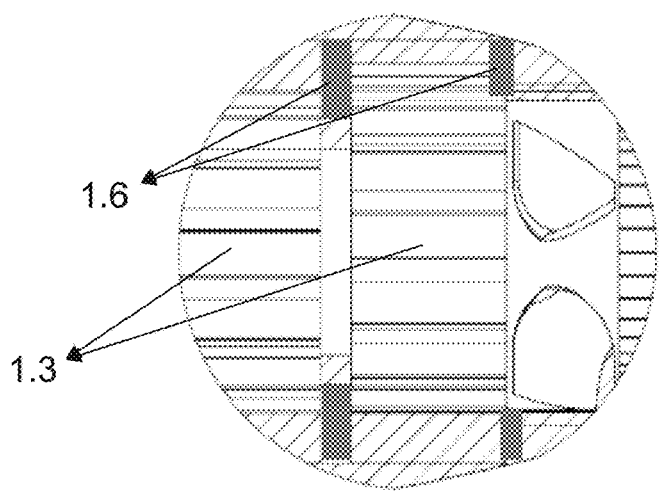
FIG. 6 shows an enlarged view of section C of FIG. 5.
Figure 7:
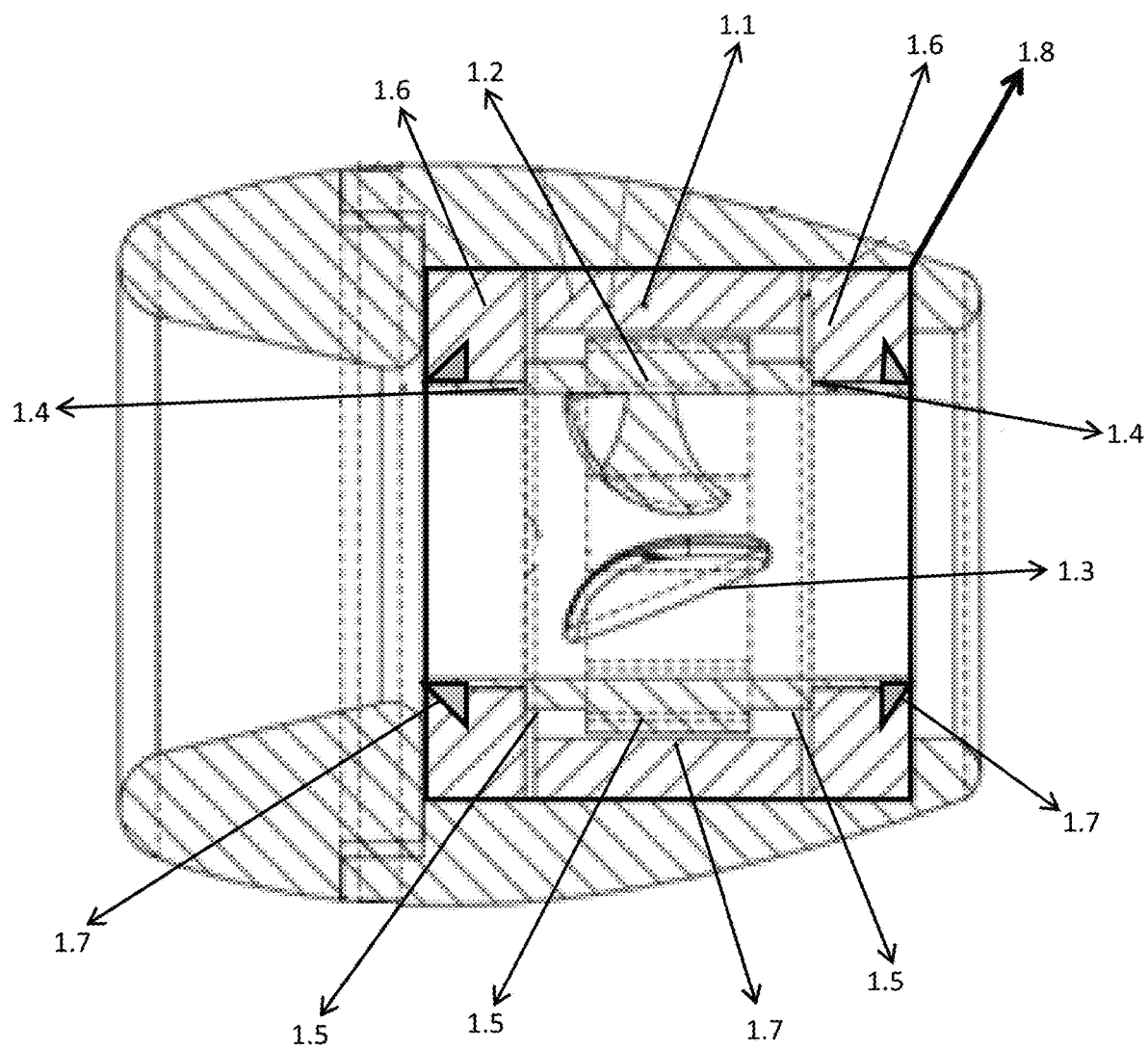
FIG. 7 shows a section view of the motor body.
Figure 8:
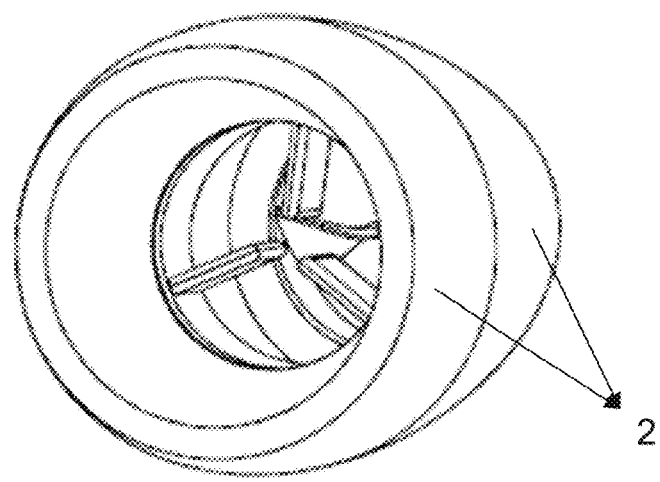
FIG. 8 shows a perspective view of the electric jet motor.
Figure 9:
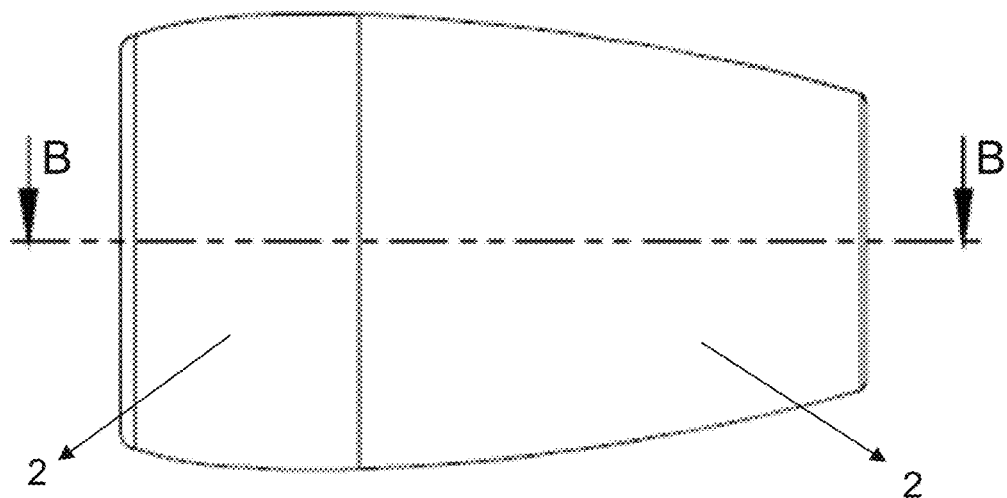
FIG. 9 shows a top view of the electric jet motor.
Figure 10:
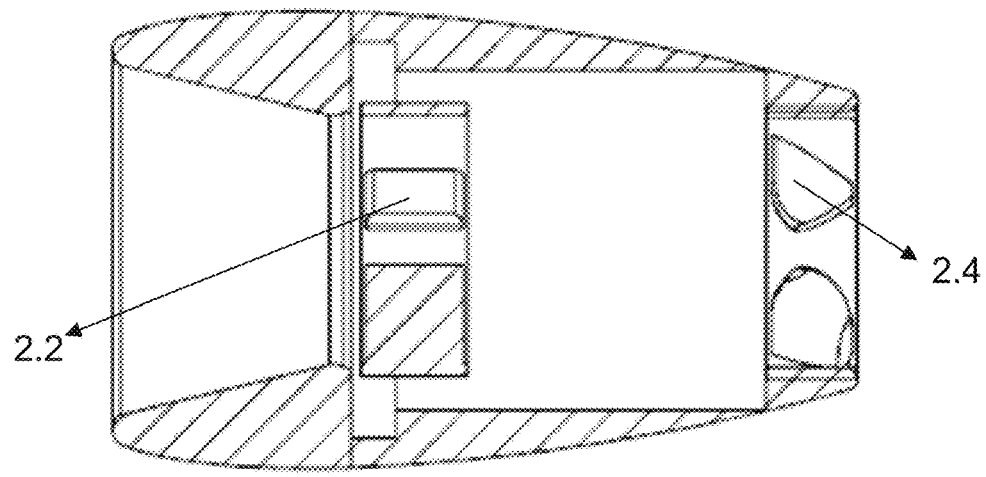
FIG. 10 shows a B-B section view of the electric jet motor.
Figure 11:
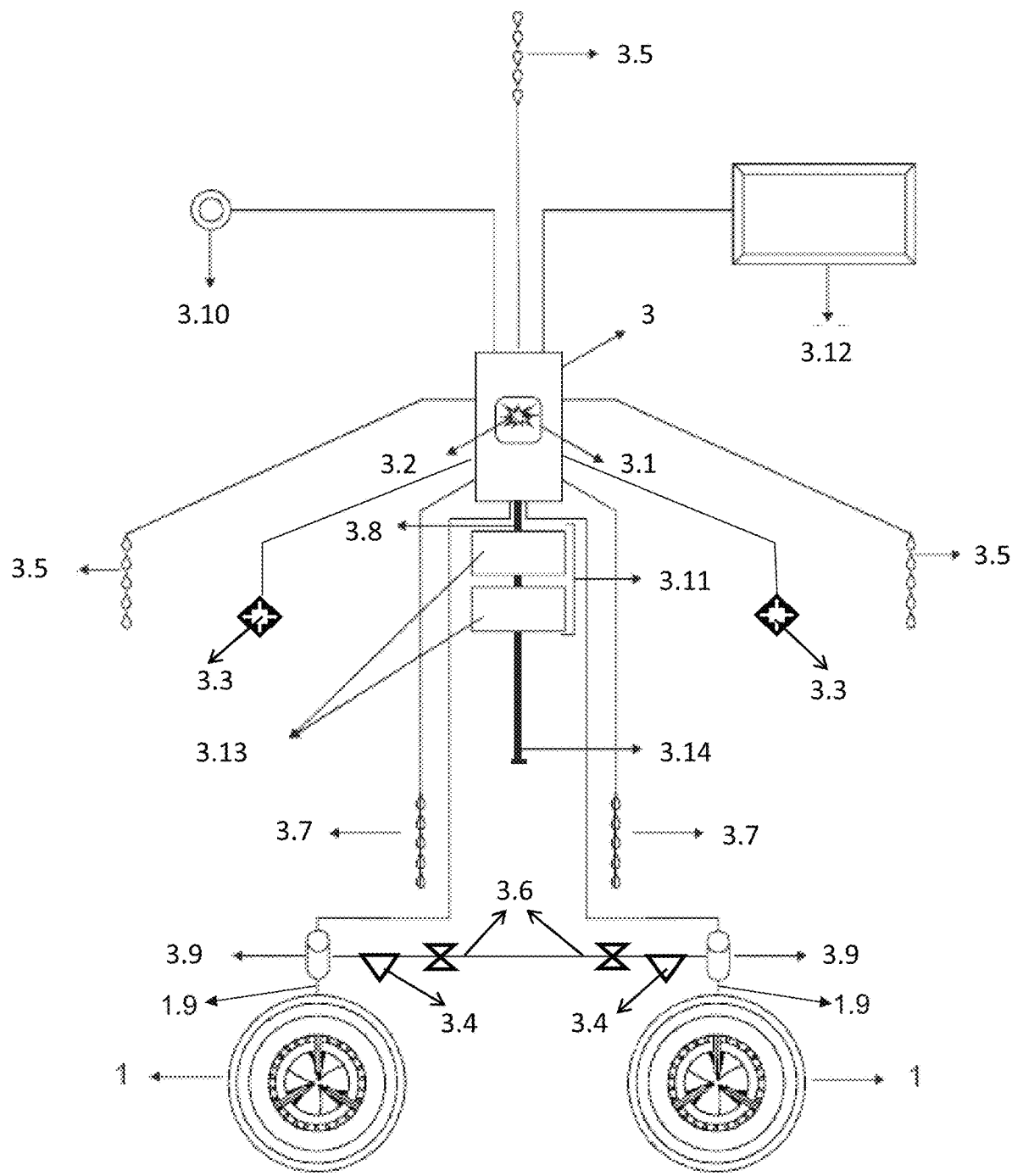
FIG. 11 shows a diagram of system operation of the electric jet motor.
Figure 12:
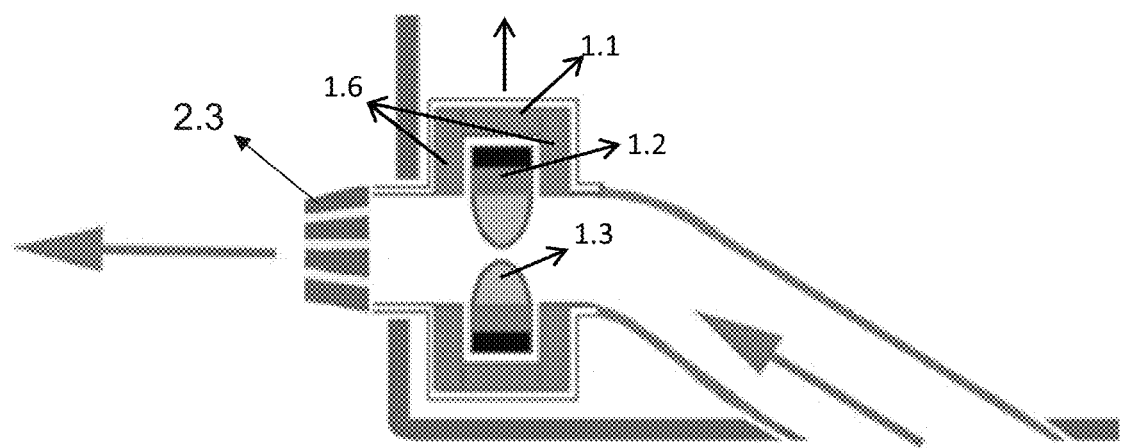
FIG. 12 shows an inboard view of the electric jet motor.
Figure 13:
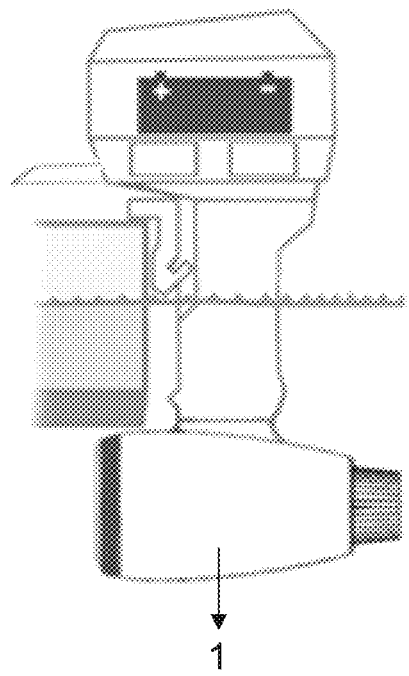
FIG. 13 shows an outboard view of the electric jet motor.

Referring to FIGS. 1-13, the invention is an electric underwater propulsion system which is developed for marine vessels, has multiple axial and radial stator, and, in which the direct-drive technology without shaft is used. The invention is characterized by the electric underwater jet engine (1), the hydrodynamic jet motor housing (2) and the control unit (3). The electric underwater jet motor (1) comprises at least one radial stator (1.1), at least one rotor (1.2), at least two impeller blades (1.3), magnetic bearing components (1.4), at least one permanent magnet bars (1.5), at least one axial stator (1.6), hydrodynamic bearing components (1.7), motor housing (1.8) and motor connection and mounting elements (1.9). The electric motor consists of the rotor (1.2) carrying the impellers and axial (1.6) and radial (1.1) stators placed in front, behind and around the motor. The stator (1.1) is located at the exterior while the rotor (1.2) carrying natural magnet bars is located at the interior. The impeller blades (1.3) are fixed in the rotor (1.2) ring without any shaft and are characterized by having narrow profile at the center while widening through the perimeter. The rotor (1.2) is characterized by its rotation on hydrodynamic bearings (1.7) without axial shaft. The rotor (1.2), together with the magnetic bearing components (1.4), rotate freely on the hydrodynamic bearing components (1.7) in the stator without contacting it.

The radial stator (1.1) and the axial stator (1.6) operate at low voltages as an ironless stator for small and medium segment marine vessels. Each stator sends an electromagnetic effect to the permanent magnets of the rotor which is under the effect of that stator in order to ensure that the rotor is rotates at the speed which is set by the energy management system of its own for the maximum efficiency or the maximum speed. The radial stators (1.1) and the axial stators (1.6) are characterized by having motor windings with specially insulated cables which suited to superconductor technology so that they are used in large size versions of the motor for large and heavy marine vehicles. The stators of the electrical motor, which can be made of various inorganic or organic materials like copper, iron, chromium, aluminum, carbon compounds or superconducting properties, is driven by a drive circuit. The speed of rotation is detected by means of an encoder at any time and is evaluated by the microprocessor. The permanent magnet bars (1.5) are characterized by their shapes that will work compatibly with the hydrodynamic bearing components (1.7). The motor housing (1.8) carries axial radial and conical hydrodynamic bearing components (1.7). The motor connection and mounting elements (1.9) provides the connection of the electric underwater jet motor (1) with the marine vehicle and has sufficient durability. The hydrodynamic bearing components (1.7) are pressure bearing surfaces, characterized by their material of at least one composite material such as carbon fiber, teflon, carbon or graphite.

The hydrodynamic jet motor housing (2) consists of the hydraulic system that adjusts steering, and the diameter and direction of the nozzle (2.1). The hydrodynamic jet motor housing (2) also comprises the flow straightener (2.2), nozzle (output) (2.3) and diffuser blades (2.4). The hydraulic system that adjusts steering, and the diameter and direction of the nozzle (2.1), adjusts the output diameter for an optimum water jet according to economical or high-speed options by means of processing data from pressure sensors via the microprocessor and software algorithms. The hydraulic system that adjusts steering, and the diameter and direction of the nozzle (2.1), adjusts the direction and tilt of the electric underwater jet motor (1) according to economical or high-speed options set by the user and it controls the performance and steering by means of processing data from pressure sensors via the microprocessor and software algorithms. When the rotor (1.2) is rotated together with impeller (1.3), it pushes the internal water towards the direction of nozzle (2.3). This highly accelerated water forms the "water jet" while passing through the nozzle (2.3) at a high speed which results in propulsion in the reverse direction. The nozzle output diameter can be increased or decreased for the optimum water jet. By this way, the required propulsion is provided in the most efficient way for a wide range of speeds by means of adjusting output diameter to its optimum value for the current speed.

In the new system, the high-pressure water is converted into high-speed water jet by means of the nozzle so that the battery-power is converted to propulsion-power with the minimum loss. The flow straightener (2.2); it reduces turbulence of the fluid entering the electric underwater jet motor and regulates the angle of attack of the impeller blades for maximum efficiency. The flow straightener (2.2) minimizes the losses due to turbulence. The nozzle (2.3) has a conical shape that increases the speed of the fluid exiting the electric underwater jet motor by reducing its pressure. The nozzle (2.3) consists of moving parts that regulate the output diameter. These moving parts are controlled by the hydraulic system that adjusts steering, and the diameter and direction of the nozzle (2.1). The diffuser blades (2.4) reduce the turbulence of the water jet exiting the electric underwater jet motor and correct the angle of exit from the impeller blades in the axial direction and thereby increase efficiency.

Control unit (3) consists of the microprocessor (3.1), software (3.2), magnetic bearing (distance) sensors (3.3), counter, hall effect and speed measurement sensors (3.4), gyroscopic balance sensors (3.5), heat and humidity sensors (3.6), pressure measuring sensors (3.7), voltage and ampere measurement sensors (3.8), motor drive circuit (3.9), software algorithms (3.10), energy management system (3.11), control board (3.12), batteries (3.13), battery charging components (3.14). Via the software algorithms (3.10), the microprocessor (3.1) determines how much power each stator surrounding the rotor (1.2) receives. The control panel (3.12) enables the electric underwater jet engine to operate according to options such as economic driving, high speed driving and constant speed driving. The control panel (3.12) has the necessary equipment for maneuvering the vessel by the user and braking the vehicle by turning the impeller blades in the opposite direction if necessary. The microprocessor (3.1), software (3.2) and software algorithms (3.10) work together to operate electric underwater jet motor in the most efficient way according to the options such as economic driving, high speed driving and constant speed driving specified by the user through the control panel (3.12). According to the data coming from the magnetic bearing (distance) sensors (3.3), counter, hall effect and speed measurement sensors (3.4), gyroscopic balance sensors (3.5), heat and humidity sensors (3.6), pressure measuring sensors (3.7), and voltage and ampere measurement sensors (3.8), the software (3.2) decides via artificial-intelligence which coils are assigned as the active stator coils and which coils are assigned as the passive stator coils to achieve highest efficiency by considering the different speeds and output diameters that are defined by the software algorithms (3.10). The magnetic bearing (distance) sensors (3.3) are the part that transmits the distance between the rotor (1.2) and the stator to the microprocessor (3.1) in real time to ensure non-contact rotation in the magnetic bearing. The gyroscopic balance sensors (3.5) transmit real-time data to the microprocessor (3.1) to adjust the position of the electric underwater jet motor in such a way that the vessel is least affected by sea currents and wave motions that result in seasickness on passengers at sea, and to coordinate the rotation of the impeller blades for a pulsatile-flow so that sea currents and wave motions are dumped.

By this way, it helps to maintain the balance of the vessel. In case more than one electric underwater jet motor are connected to the vessel, the software (3.2) maintains the balance by processing the data collected from the gyroscopic balance sensors of all motors with the software algorithms (3.10) under the control of microprocessor (3.1). The pressure measuring sensors (3.7) transmit the measured output pressure of the electric underwater jet motor to the microprocessor (3.1) in real time so that the diameter of the nozzle (2.3) is changed according to the options such as economic driving, high speed driving and constant speed driving.

The maneuverability of the vessels is increased via servo-controlled electric motors by the use of more than one electric underwater jet motor (1). The microprocessor (3.1), software (3.2) and software algorithms (3.10) are characterized by having the necessary equipment to provide this high maneuverability and control when more than one electric underwater jet motor (1) connected to the vessel. Multiple electric underwater jet motors are used with a single control panel (3.12). Multiple electric underwater jet motors (1) can be connected to the vessel in the inboard as well as the outboard position.

When double rotors are used, the rotational direction of the rotors will be opposite to each other and the system will work in a balanced way. For the balanced operation of a single motor, two separate rotors are provided that each rotor includes two separate propeller blades. These will be rotated by two adjacent rotors and stators rotating in opposite direction to each other in the same direction of water propulsion. A different number of pairs of magnets will be placed in the rotors so that the two separate rotors with a single radial stator rotate in different directions. Thus, if the rotors driven by the stator are two or more multiples of two, the rotational directions are designed to be opposite to each other for the system's stable operation. The data obtained from gyroscopic balance sensors is processed by the microprocessor to minimize the vibrations that occur in vessels and cause problems such as seasickness in passengers. Additionally, since there is no axial shaft, no additional resistance against water fluid will occur and the system will operate with higher efficiency. Thus, the system will be able to work with high efficiency without supply and maintenance for long years and spare parts costs will be low.

The electric underwater jet motor (1) operates as a turbine while the vessel is driven by sail via wind power in sailing vessels and recharges its batteries. When the electric underwater jet motor (1) is not used propulsion in the parked position, it recharges the batteries by generating electricity from wave power by bringing the motor in an upright position. When the motor is at the upright position, the rotor rotates at low speed with the raising and lowering movement of the waves, and the batteries are charged with the produced energy under the control of microprocessor.

In summary, the invention is an electric underwater jet motor system designed for vehicles traveling above or below the sea and which contains multiple stator units which are equipped with microprocessors containing relevant algorithms for certain speeds. Naturally, this system can be applied to all marine vehicles intended for civilian or military purposes. Compared to similar electric motors, these engines we have described have high efficiency and are much more powerful while they are small and they consume less energy. The surfaces of the rotor which are affected by the corresponding stator rotate at the hydrodynamic magnetic bearing which is designed for maximum efficiency. In high power motors, the rotor rotates in axial and radial directions, in the hybrid hydrodynamic bearing and magnetic bed, and the rotor and stator do not contact each other. It can also be used as a turbine at times when the engine is not used for propulsion, and the propeller blades rotating by waves or water flow can recharge the batteries. Especially in the case of sailboats, the battery can be recharged using the proposed invention as a turbine.

What is claimed is:

1. An electric underwater jet motor, comprising: a plurality of stators for marine crafts; at least one radial stator, at least one rotor with blades, at least two impeller blades, a magnetic bearing; at least one permanent magnet bar; at least one axial stator, hydrodynamic bearing components, a motor housing and an engine fastener; a hydrodynamic jet motor housing; and a control unit including a microprocessor, a software, magnetic bearing distance sensors, counter and speed measurement sensors, gyroscopic balance sensors, heat and humidity sensors, pressure measurement sensors, voltage and ampere measurement sensors, a motor drive circuitry, software algorithms, an energy management system, a control panel, batteries and battery charging components; wherein, the gyroscopic balance sensors are configured to balance the electric underwater jet motor on water according to sea currents and wave movements.

2. The electric underwater jet motor according to claim 1, wherein the at least two impeller blades are fixed to the at least one rotor without a pivot shaft.

3. The electric underwater jet motor according to claim 1, wherein the at least one rotor is configured to rotate on the hydrodynamic bearing components without any shaft.

4. The electric underwater jet motor according to claim 1, wherein the radial stator and the axial stator are ironless stators; each stator is configured to be controlled by the energy management system in a high efficiency mode or a high speed mode; wherein the radial stator and the axial stator have motor windings of insulated cables of superconductor material.

5. The electric underwater jet motor according to claim 1, wherein the hydrodynamic bearing components are attached on motor housing.

6. The electric underwater jet motor according to claim 1, wherein motor connection and mounting elements are configured to connect the electric underwater jet motor to a marine vehicle.

7. The electric underwater jet motor according to claim 1, wherein each hydrodynamic bearing component is made of at least one composite material selected from the group consisting of a carbon fiber, teflon, carbon and graphite.

8. The electric underwater jet motor according to claim 1, wherein the hydrodynamic jet motor housing comprises a hydraulic system for adjusting steering positions and an output diameter of a nozzle having a conical shape for decreasing a pressure of the water inside the electric underwater jet motor and increase a velocity of the water jet at an output of the electrical underwater jet motor, a flow straightener, and a plurality of diffuser blades.

9. The electric underwater jet motor according to claim 8, wherein the hydraulic system is configured for adjusting a direction of a water jet according to data received from the control unit.

10. The electric underwater jet motor according to claim 9, wherein the hydraulic system is configured to adjust a steering direction and a diameter of the nozzle by adjusting the performance, the tilt degree and direction of the electric underwater jet motor according to driving options expected by a user by changing a direction and inclination of the control unit with the data received from the sensors and the software.

11. The electric underwater jet motor according to claim 10, wherein the nozzle contains moving parts for adjusting an output diameter.

12. The electric underwater jet motor according to claim 8, wherein the flow straightener is configured to reduce a turbulence of a fluid entering the electrical underwater jet motor and correcting an attack angle of entry into the impeller blades.

13. The electric underwater jet motor according to claim 8, wherein the diffuser blades are configured to reduce a turbulence of a water jet coming out of the electric underwater jet motor and correcting the flow through an exit angle in an axial direction from the impeller blades.

14. The electric underwater jet motor according to claim 1, wherein the microprocessor is configured to control a power provided to coils of stators surrounding the at least one rotor to ensure that rotation of the at least one rotor is contactless and at a constant speed according to a distance and balance data obtained from the gyroscopic balance sensors and the magnetic bearing distance sensors.

15. The electric underwater jet motor according to claim 1, wherein the control panel is configured to adjust an operating range of the electric underwater jet motor according to a user selected mode of operation; wherein the control panel is configured to provide a control of direction of the marine crafts to the user and the control panel is provided with a function for braking by reversing the blades of the at least one rotor in an opposite direction.

16. The electric underwater jet motor according to claim 1, wherein the microprocessor is configured to adjust rotation speed and output diameters of the electric underwater motor according to a driving option selected from the control panel.

17. The electric underwater jet motor according to claim 1, wherein the software is configured to activate and inactivate stator coils according to data received from the magnetic bearing distance sensors, the counter and speed measurement sensors, the gyroscopic balance sensors, the pressure measuring sensors and the voltage and ampere measurement sensors.

18. The electric underwater jet motor according to claim 1, wherein the magnetic and bearing distance sensors collect real time distance data between the at least one rotor and the plurality of stators and send the real time distance data to the microprocessor for providing contactless rotation to the at least one rotor.

19. The electric underwater jet motor according to claim 1, wherein the batteries are configured to recharge when the marine vehicle is a sail boot and driving by a sail.

20. The electric underwater jet motor according to claim 1, wherein the electric underwater jet motor is configured to recharge the batteries when the electric underwater jet motor is not operating to thrust a boat, wherein, the electric underwater jet motor is configured to move in a vertical position on the sea as a unit to generate electricity controlled by the microprocessor when the rotor rotates with the rising and lowering of waves.

21. The electric underwater jet motor according to claim 1, wherein the electric underwater jet motor has two rotors and directions of rotation of the two rotors are opposite to each other.

* * * * *